(12) United States Patent
Kursawe et al.

(10) Patent No.: US 11,719,279 B2
(45) Date of Patent: Aug. 8, 2023

(54) PIVOT BEARING

(71) Applicant: Schaeffler Technologies AG & Co. KG

(72) Inventors: Serge Kursawe, Uttenreuth (DE); Thomas Weitkamp, Spenge (DE); Frank Bolte, Melle (DE); Thomas König, Röttenbach (DE); Nikolay Podgaynyy, Adelsdorf (DE)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 114 days.

(21) Appl. No.: 17/311,382

(22) PCT Filed: Sep. 9, 2019

(86) PCT No.: PCT/DE2019/100800
§ 371 (c)(1),
(2) Date: Jun. 7, 2021

(87) PCT Pub. No.: WO2020/114538
PCT Pub. Date: Jun. 11, 2020

(65) Prior Publication Data
US 2022/0025926 A1    Jan. 27, 2022

(30) Foreign Application Priority Data
Dec. 5, 2018  (DE) .................. 10 2018 131 021.8

(51) Int. Cl.
*F16C 23/04*  (2006.01)
*F16C 33/04*  (2006.01)
*F16C 33/12*  (2006.01)

(52) U.S. Cl.
CPC .......... *F16C 23/045* (2013.01); *F16C 33/043* (2013.01); *F16C 33/125* (2013.01)

(58) Field of Classification Search
CPC .... F16C 23/045; F16C 33/043; F16C 33/121; F16C 33/122; F16C 33/125
See application file for complete search history.

(56) References Cited

U.S. PATENT DOCUMENTS

| 4,848,934 A | 7/1989 | Blakely et al. |
| 5,328,273 A | 7/1994 | Nonaka et al. |
| (Continued) | | |

FOREIGN PATENT DOCUMENTS

| AT | 412284 B | 12/2004 |
| CN | 101248283 A | 8/2008 |
| (Continued) | | |

OTHER PUBLICATIONS

Standard VDI 2840 2012-06-00. Carbon layers—basics, layer types and properties. pp. 1-43. (Right column is in English).
International Search Report for Corresponding PCT/DE2019/100800.

*Primary Examiner* — James Pilkington
(74) *Attorney, Agent, or Firm* — Davidson, Davidson & Kappel, LLC

(57) ABSTRACT

A pivot bearing (1), includes a metallic first bearing element (2) made of steel, which is at least partially coated by means of a coating (5), a metallic second bearing element (3) made of steel, which is coated with a PTFE-containing sliding lining (6), wherein the coating (5) and the sliding lining (6) are in sliding contact, and wherein the coating (5) comprises at least one first layer (9) deposited on the first bearing element (2) by means of a PVD, CVD, or PECVD method, wherein the coating (5) also comprises at least one further layer which is arranged on the at least one first layer (9) and faces away from the first bearing element (2).

20 Claims, 1 Drawing Sheet

(56) References Cited

U.S. PATENT DOCUMENTS

| | | |
|---|---|---|
| 9,353,792 B2 * | 5/2016 | Hachtmann ............ F16C 17/246 |
| 2004/0177902 A1 | 9/2004 | Mergen et al. |
| 2005/0036722 A1 | 2/2005 | Sato et al. |
| 2007/0223850 A1 | 9/2007 | Lopes et al. |
| 2009/0154990 A1 | 6/2009 | Julliere |
| 2009/0290822 A1 * | 11/2009 | Wilson ................ F16C 33/124 |
| | | 384/625 |
| 2010/0314005 A1 | 12/2010 | Saito et al. |
| 2011/0142384 A1 | 6/2011 | Hofmann |
| 2013/0136861 A1 | 5/2013 | Barenreuter et al. |
| 2015/0018254 A1 | 1/2015 | Araujo et al. |
| 2016/0298750 A1 | 10/2016 | Schreiber et al. |
| 2017/0016480 A1 | 1/2017 | Rittmann et al. |
| 2018/0187781 A1 | 7/2018 | Moronuki |

FOREIGN PATENT DOCUMENTS

| | | |
|---|---|---|
| CN | 103620085 A | 3/2014 |
| CN | 104271802 A | 1/2015 |
| CN | 104837621 A | 8/2015 |
| CN | 106051091 A | 10/2016 |
| DE | 6933010 U | 11/1969 |
| DE | 3509572 C1 | 7/1986 |
| DE | 102006027502 A1 | 3/2007 |
| DE | 102013225860 A1 | 6/2015 |
| DE | 102014107036 A1 | 11/2015 |
| DE | 102015105520 A1 | 10/2016 |
| EP | 1582756 A2 | 10/2005 |
| JP | H0712624 U | 3/1995 |
| JP | 2005030492 A | 2/2005 |
| JP | 2012500365 T2 | 1/2012 |

\* cited by examiner

PIVOT BEARING

CROSS-REFERENCE TO RELATED APPLICATIONS

This application is the U.S. National Phase of PCT Appln. No. PCT/DE2019/100800 filed Sep. 9, 2019, which claims priority to DE 10 2018 131 021.8 filed Dec. 5, 2018, the entire disclosures of which are incorporated by reference herein.

The present disclosure relates to a pivot bearing comprising a metallic first bearing element made of steel, which is at least partially coated by means of a coating, and a metallic second bearing element made of steel, which is at least partially coated with a PTFE-containing sliding lining.

BACKGROUND

Sliding bearings in the form of pivot bearings with the above-mentioned structure are well known. In most cases, a hard chrome layer was applied as a coating to an inner ring with a spherical surface in order to increase the wear protection in the area of the sliding contact between the inner ring and the outer ring and to provide corrosion protection. Chromium (VI)-containing electrolyte baths are usually used to produce such hard chrome layers, which are now classified as questionable from an environmental point of view and the use of which is increasingly subject to legislative restrictions.

Accordingly, there is a need to replace the hard chrome layer with a coating that can be produced in a more environmentally friendly manner.

DE 10 2013 225 860 A1 already discloses a sliding bearing, in particular a pivot bearing, in which the hard chrome layer is replaced by nitrocarburizing an inner ring made of steel, such as 100Cr6. The nitrocarburized surface thus forms the first sliding surface.

DE 10 2014 107 036 A1 discloses a pivot bearing having a coated titanium ball. The pivot bearing comprises an inner ring which is rotatably arranged in a bushing and which can be provided with a DLC coating. A lubricant in the form of a film can be arranged between the inner ring and the bushing.

From DE 69 330 10 U a pivot bearing is known which has an outer ring in which a sleeve is floatingly mounted. This sleeve is coated with polytetrafluoroethylene (PTFE) on one side, namely on the inner facing away from the outer ring.

US 2007/0 223 850 A1 describes a pivot bearing in which a bearing element is formed from a titanium alloy which has a PVD coating made of TiN. The other bearing element has a lubricating coating containing PTFE.

DE 10 2015 105 520 A1 discloses a transmission and a method for producing or operating the transmission. A coated thrust washer is provided, wherein the coating can comprise an amorphous carbon layer, for example a DLC (diamond-like carbon) layer, a chrome layer, layers that are applied by means of PVD coating, crystalline carbon layers and/or diamond coatings. The layer applied by means of PVD coating can comprise TiN, CrN, TiAlN, TiCN, TiSiN, ZrN and/or AlTiN.

AT 412 284 B describes a carrier layer for a bearing element made from a wrought aluminum alloy. Furthermore, a bearing element, in particular for a sliding bearing or a thrust ring, is described, with a support shell, a running layer and the carrier layer arranged therebetween. The running layer is designed as a lead, tin, bismuth, indium or copper-based alloy, as a plastic layer, in particular containing solid lubricant, or as a lubricating varnish.

SUMMARY

An object of the present disclosure is to provide a pivot bearing that has been further developed with respect to the mentioned prior art, with rational, environmentally friendly manufacturing options being provided.

A pivot bearing is provided that comprises a metallic first bearing element made of steel, which is at least partially coated by means of a coating, and a metallic second bearing element made of steel, which is at least partially coated with a sliding lining containing PTFE (polytetrafluoroethylene), wherein the coating and the sliding lining are in sliding contact and wherein the coating comprises at least one first layer deposited on the first bearing element by means of a PVD, CVD or PECVD process.

In a first embodiment, the at least one first layer is designed as an oxidic, nitridic, oxynitridic or carbidic hard material layer and contains at least one of the elements titanium, aluminum, chromium, tungsten and molybdenum. The hard material layer is preferably formed from at least one material from the group comprising TiN, TiCN, $Al_2O_3$, TiAlN, CrN, AlCrN, MoN, WC. Mixed forms of these materials, optionally with doping, are also suitable as the first layer(s).

In a further preferred embodiment, the at least one first layer is designed as an amorphous carbon layer or a diamond layer. The amorphous carbon layer (nomenclature according to VDI2840, June 2012) can be formed from hydrogen-free amorphous carbon ta-C or a-C. Alternatively, the amorphous carbon layer can be formed from hydrogen-containing amorphous carbon a-C:H. Metallic or non-metallic doping can also be provided here. A metal used for doping is, for example, tungsten, titanium, silicon or tantalum. A hydrogen-containing tungsten-doped amorphous carbon layer (a-C:H:W) or a hydrogen-containing silicon-doped amorphous carbon layer (a-C:H:Si) is preferred. An amorphous carbon layer containing a non-metal is designated as a-C:H:X, where X stands for a non-metal, such as nitrogen.

In a further preferred embodiment, the at least one first layer is a metallic layer which is formed from one or more of the metals comprising chromium, brass, bronze, white metal, copper, zinc or tin.

Only a first layer or a combination of two, three or more first layers can be arranged on the first bearing element.

Parts of the pivot bearing therefore include a first bearing element which is coated—in particular in multiple layers—and a second bearing element which has a PTFE-containing sliding lining.

The sliding lining is in particular glued to the metallic second bearing element and reinforced with PTFE fibers. Textile materials such as woven fabrics, knitted fabrics, crocheted fabrics and the like are generally used as fibers for reinforcing the sliding lining. In addition to the PTFE fibers, support fibers, in particular made of another plastic, metal, glass, carbon or ceramic, can be provided, wherein these can be present alone or in any combination with one another. In a preferred embodiment, the sliding lining contains a PTFE fabric in a resin matrix.

Alternatively, the sliding lining has a layer of sintered bronze, which is provided with a PTFE layer, so that in the area of the sliding contact a metallic-polymer composite material is present.

The first bearing element can be the inner ring or the outer ring of a pivot bearing. Thus, the inner ring preferably has the coating and the outer ring has the sliding lining. However, an inverse arrangement is also possible.

The deposition processes used, such as the PVD (physical vapor deposition) process, the PECVD (plasma enhanced chemical vapor deposition) process and the CVD (chemical vapor deposition) process, have in common that, in contrast to the hard chrome plating used by the majority at the time of priority, here the use of chromium (VI)-containing substances on a bearing element is avoided.

According to the present disclosure, the coating further comprises at least one further layer which is arranged on the at least one first layer and faces away from the first bearing element. The at least one further layer has a composition that differs from that of an immediately adjoining first layer.

It has proven useful if the coating comprises exactly one first layer and exactly one further layer. However, the coating can advantageously also comprise two or three first layers and exactly one further layer.

It has proven to be advantageous if the at least one further layer, which adjoins the at least one first layer, which is arranged facing away from the first bearing element, forms a second layer which differs from the adjoining first layer in its composition and is formed either by means of a PVD, CVD or PACVD process and/or is formed from a lubricating varnish comprising PTFE.

The at least one further layer is preferably formed by means of a PVD, CVD or PACVD process and is designed either
- as an oxidic, nitridic, oxynitridic or carbidic hard material layer or
- as an amorphous carbon layer or a diamond layer, or
- as a metallic layer made of chromium, brass, bronze, white metallic, copper, zinc or tin.

A further layer in the form of an oxidic, nitridic, oxynitridic or carbidic hard material layer contains in particular at least one of the elements titanium, aluminum, chromium, tungsten and molybdenum. The hard material layer is preferably formed from at least one material from the group comprising TiN, TiCN, $Al_2O_3$, TiAlN, CrN, AlCrN, MoN, WC. Mixed forms of these materials, optionally with doping, are also suitable as further layer(s).

Another layer in the form of an amorphous carbon layer (nomenclature according to VDI2840, June 2012) is formed in particular from hydrogen-free amorphous carbon ta-C or a-C. Alternatively, the amorphous carbon layer can be formed from hydrogen-containing amorphous carbon a-C:H. Metallic or non-metallic doping can also be provided here. A metal used for doping is, for example, tungsten, titanium, silicon or tantalum. A hydrogen-containing tungsten-doped amorphous carbon layer (a-C:H:W) or a hydrogen-containing silicon-doped amorphous carbon layer (a-C:H:Si) is preferred. An amorphous carbon layer containing a non-metal is designated as a-C:H:X, where X stands for a non-metal, such as nitrogen.

The coating preferably has the at least one first layer, a second layer and a layer sequence thereon, the layer sequence having alternating third layers and fourth layers, a composition of the third layers corresponding to a composition of the first layer adjoining the second layer and a composition of the fourth layers corresponding to a composition of the second layer. As a result, a particularly durable coating can be formed that combines good lubricating properties with good wear resistance.

In particular, pivot bearings have proven to be useful in which the first layer adjoining the second layer is made of molybdenum nitride and the second layer is made of copper. In particular, several third layers made of molybdenum nitride and several fourth layers made of copper are also provided, which are arranged in an alternating manner and form a layer sequence. The copper forms a lubricating film, while the molybdenum nitride reduces abrasive wear.

Furthermore, pivot bearings in which the first layer is formed from chromium and the second layer is formed from chromium nitride have proven successful.

Pivot bearings with a first layer made of chromium, a further first layer made of tungsten carbide and the second layer made of a hydrogen-containing tungsten-doped amorphous carbon layer of the type a-C:H:W have also proven to be very wear resistant.

Furthermore, pivot bearings are preferred, wherein the first layer is a silicon-doped amorphous carbon layer of the type a-C:H:Si and the second layer is an amorphous carbon layer of the type a-C:H. In particular, several third layers of the type a-C:H:Si and several fourth layers of the type a-C:H are also provided, which are arranged in an alternating manner and form a layer sequence.

Furthermore, pivot bearings are preferred, wherein the first layer is a silicon-doped amorphous carbon layer of the type a-C:H:Si and the second layer is an amorphous carbon layer of the type a-C:H:Si with different silicon doping.

A lubricating varnish, in particular in the form of a PTFE impregnation layer, can also be arranged on the at least one first layer as the second layer. The PTFE impregnation layer is a layer which is formed exclusively or at least 98%, in particular at least 99%, from PTFE (polytetrafluoroethylene) . Despite possible individual damage to the PTFE impregnation layer, the sliding surface formed by PTFE remains largely intact during operation of the pivot bearing, wherein self-repair effects are also provided within the PTFE impregnation layer. The PTFE impregnation layer offers the possibility of absorbing particles occurring during operation of the sliding bearing, in particular particles arising from abrasion.

In all cases, the hardness of the at least one first layer—regardless of the measurement method used—is by far greater than the hardness of the sliding lining arranged on the metallic second bearing element.

A few preferred exemplary embodiments for the coating of the metallic first bearing element made of steel are listed below. The layer sequence on the first bearing element or substrate made of steel is implemented in the specified sequence.

| Example 1: Steel substrate | Example 2: Steel substrate |
|---|---|
| First layer: Chromium | First layer: Chromium |
| Second layer: Chromium nitride | Further first layer: Tungsten carbide (WC) |
| | Second layer: a-C:H:W |
| Example 3: Steel substrate | Example 4: Steel substrate |
| First layer: a-C:H:Si | First layer: TiN or TiAlN or CrAlN |
| Second layer: a-C:H | |
| | Second layer: PTFE-containing lubricating varnish |
| Example 5: Steel substrate | |
| First layer: Chromium molybdenum | |
| Further first layer: Molybdenum nitride (MoN) | |
| Second layer: Copper | |
| Third layers: Molybdenum nitride (MoN) | |

-continued

Fourth layers: Copper
Example 6: Steel substrate
First layer: a-C:H:Si
Second layer: a-C:H:Si, where the silicon content in the second layer corresponds only to 20-25% of the silicon doping in the first layer

BRIEF SUMMARY OF THE DRAWINGS

Below, exemplary embodiments of the present disclosure are explained in more detail by means of the drawings. In the figures.

DETAILED DESCRIPTION

Parts that correspond to each other or have basically the same effect are marked with the same reference symbols in all figures.

Figure 1:
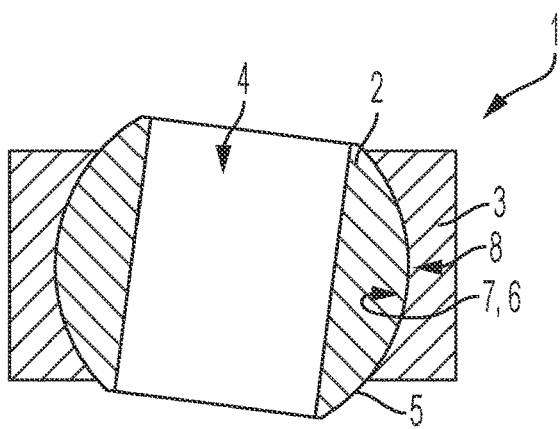
FIG. 1 shows a pivot bearing according to the present disclosure in a schematic sectional illustration.

A pivot bearing shown in sectional view in FIG. 1, identified as a whole with the reference symbol 1, is formed from a metallic first bearing element 2 made of steel, here an inner ring, and a metallic second bearing element 3 made of steel, here an outer ring. The first bearing element 2 has a central opening 4 for connection to a connecting part. The coating 5 is applied to a convex outer surface 8 of the first bearing element 2. A PTFE fiber-reinforced sliding lining 6 is glued onto a concave inner surface 7 of the second bearing element 3. The coating 5 of the first bearing element 2 is in sliding contact with the sliding lining 6.

Figure 2:
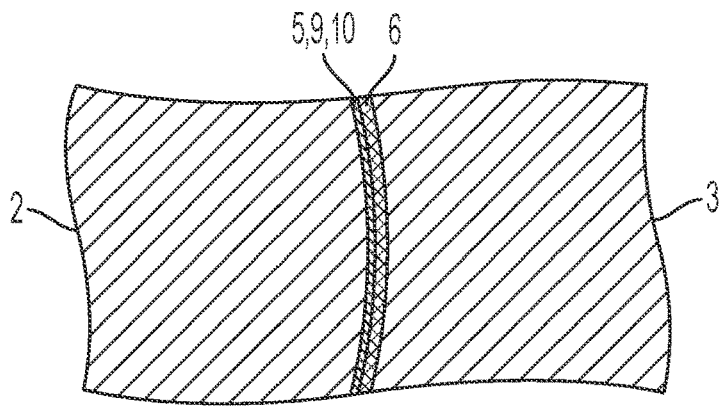
FIG. 2 shows an enlarged illustration in the area of the sliding contact of FIG. 1.

FIG. 2 shows an enlarged illustration in the area of the sliding contact of FIG. 1. A coating 5 made of a first layer 9 made of TiN or TiAlN or CrAlN is deposited on the metallic base material of the first bearing element 2 made of steel by means of gas phase deposition (PVD, CVD, PECVD). The first layer 9 has an essentially uniform thickness. As a result, the surface of the first layer 9 adapts to the given convex outer surface 8. Furthermore, a lubricating varnish in the form of a PTFE impregnation layer is applied on the first layer 9 as a second layer 10. Any unevenness in the first layer 9 that may be present is leveled out by the PTFE impregnation layer, so that a smooth, in the present case spherical, outer surface of the first bearing element 2 results.

Figure 3:
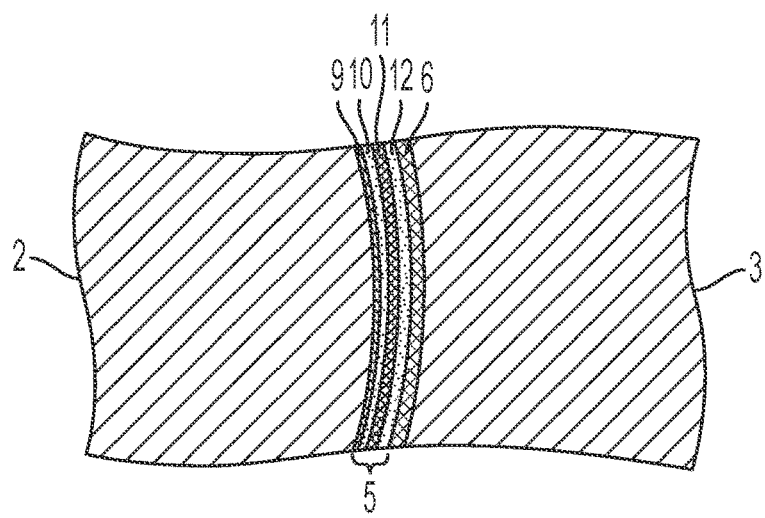
FIG. 3 shows an enlarged illustration analogous to FIG. 2 with a different coating.

FIG. 3 shows an illustration analogous to FIG. 2, but with a different type of coating 5 on the first bearing element 2. The first layer 9 is applied directly to the convex outer surface 8 of the first bearing element 2 made of steel and is formed from molybdenum nitride. Alternatively, at least one further first layer, in particular made of chromium and/or molybdenum, can be arranged between the first bearing element 2 and the first layer 9. A second layer 10 is provided, which is formed from copper. A third layer 11 made of molybdenum nitride and a fourth layer 12 made of copper adjoin the second layer 10. A layer sequence is provided on alternately arranged third layers 11 and fourth layers 12.

The concave inner surface 7 of the second bearing element 3 is also glued here with the sliding lining 6. The sliding lining 6 is formed by a PTFE fabric embedded in a resin matrix or has a metallic-polymer composite material containing sintered bronze and PTFE. The multi-layer coating 5 of the first bearing element 2 is in sliding contact with the sliding lining 6.

LIST OF REFERENCE SYMBOLS

1 Pivot bearing
2 Bearing element
3 Bearing element
4 Opening
5 Coating
6 Sliding lining
7 Concave inner surface
8 Convex outer surface
9 First layer
10 Second layer
11 Third layer
12 Fourth layer

What is claimed is:

1. A pivot bearing comprising
a metallic first bearing element made of steel, the metallic first bearing element at least partially being coated by means of a coating; and
a metallic second bearing element made of steel, the metallic second bearing element being coated with a PTFE-containing sliding lining;
the coating and the sliding lining being in sliding contact, the coating including at least one first layer deposited on the first bearing element by a PVD, CVD or PECVD method;
wherein at least one of:
the at least one first layer is either an oxidic, nitridic, oxynitridic or carbidic material layer which contains at least one of the elements from the group consisting of titanium, aluminum, chromium, tungsten and molybdenum, or
the at least one first layer is an amorphous carbon layer or a diamond layer, or
the at least one first layer is a metallic layer formed from one or more of the metals of the group comprising chromium, brass, bronze, white metal, copper, zinc or tin;
wherein the coating further comprises at least one further layer arranged on the at least one first layer on a side of the first layer that faces away from the first bearing element,
wherein the at least one further layer includes a second layer adjoining a first layer of the at least one first layer on a side of the first layer facing away from the first bearing element, the second layer differing from the adjoining first layer in its composition and being formed either by means of a PVD, CVD or PECVD method and/or is formed from a lubricating varnish comprising PTFE.

2. The pivot bearing according to claim 1, wherein the coating comprises exactly one first layer and exactly one further layer.

3. The pivot bearing according to claim 1, wherein the coating comprises two or three first layers and exactly one further layer.

4. The pivot bearing according to claim 1, wherein the second layer is formed by a PVD, CVD or PECVD method and is either:
an oxidic, nitridic, oxynitridic or carbidic material layer, or
an amorphous carbon layer or a diamond layer, or a metallic layer made of chromium, brass, bronze, white metal, copper, zinc or tin.

5. The pivot bearing according to claim 1, wherein the coating comprises the at least one first layer, the second layer and a layer sequence thereon, wherein the layer sequence has alternating third layers and fourth layers, wherein a composition of the third layers corresponds to a composition of the first layer, and a composition of the fourth layers corresponds to a composition of the second layer.

6. The pivot bearing according to claim 1, wherein the first layer adjoining the second layer is formed from molybdenum nitride and the second layer is formed from copper.

7. The pivot bearing according to claim 1, wherein the first layer adjoining the second layer is formed from chromium and the second layer is formed from chromium nitride.

8. The pivot bearing according to claim 1, wherein the at least one first layer includes the first layer made of chromium and a further first layer made of tungsten carbide and the second layer is a hydrogen-containing tungsten-doped amorphous carbon layer of the type a-C:H:W.

9. The pivot bearing according to claim 1, wherein the first layer adjoining the second layer is a silicon-doped amorphous carbon layer of a type a-C:H:Si and the second layer is an amorphous carbon layer of a type a-C:H or an amorphous carbon layer of a type a-C:H:Si with different silicon doping than the first layer adjoining the second layer.

10. The pivot bearing according to claim 1, wherein the at least one first layer is the amorphous carbon layer or the diamond layer.

11. The pivot bearing according to claim 1, wherein the at least one first layer is the metallic layer formed from one or more of the metals of the group comprising chromium, brass, bronze, white metal, copper, zinc or tin.

12. The pivot bearing according to claim 1, wherein the second layer is formed by a PVD, CVD or PECVD method and is an oxidic, nitridic, oxynitridic or carbidic material layer.

13. The pivot bearing according to claim 1, wherein the second layer is formed by a PVD, CVD or PECVD method and is an amorphous carbon layer or a diamond layer.

14. The pivot bearing according to claim 1, wherein the second layer is formed by a PVD, CVD or PECVD method and is a metallic layer made of chromium, brass, bronze, white metal, copper, zinc or tin.

15. A pivot bearing comprising:
an inner ring made of steel; and
an outer ring made of steel;
one of the inner ring and the outer ring at least partially being coated by a coating, and the other of the inner ring and the outer ring being coated with a sliding lining including PTFE;
the coating and the sliding lining being in sliding contact, the coating including at least one first layer, the at least one first layer being a material layer, an amorphous carbon layer, a diamond layer or a metallic layer,
the material layer being an oxidic, nitridic, oxynitridic or carbidic material layer containing at least one of the elements from the group consisting of titanium, aluminum, chromium, tungsten and molybdenum,
the metallic layer being formed from one or more of the metals of the group comprising chromium, brass, bronze, white metal, copper, zinc or tin; and
the coating further comprising at least one further layer arranged on an exterior of the at least one first layer,
wherein the coating comprises two or three first layers and exactly one further layer.

16. The pivot bearing as recited in claim 15, wherein inner ring includes a convex outer surface at least partially coated by the coating and the outer ring includes a concave inner surface coated with the sliding lining.

17. The pivot bearing as recited in claim 15 wherein the least one further layer is a PTFE impregnation layer.

18. The pivot bearing as recited in claim 15 wherein the sliding lining includes:
a PTFE fabric embedded in a resin matrix, or
a metallic-polymer composite material containing sintered bronze and PTFE.

19. The pivot bearing according to claim 15, wherein the at least one further layer includes a second layer adjoining a first layer of the at least one first layer on a side of the first layer facing away from the first bearing element, the second layer differing from the adjoining first layer in its composition and being formed either by means of a PVD, CVD or PECVD method,
wherein the second layer is formed by a PVD, CVD or PECVD method and is either:
an oxidic, nitridic, oxynitridic or carbidic material layer, or
an amorphous carbon layer or a diamond layer, or
a metallic layer made of chromium, brass, bronze, white metal, copper, zinc or tin.

20. A method of creating a pivot bearing comprising:
coating a first steel bearing element with at least one first layer by PVD, CVD or PECVD;
coating a second steel bearing element with a sliding lining including PTFE;
providing at least one further layer on the at least one first layer; and
arranging the first steel bearing element and the second steel bearing element such that the sliding lining is in sliding contact with the coating and the at least one further layer is between the at least one first layer and the sliding lining,
the at least one first layer being a material layer, an amorphous carbon layer, a diamond layer or a metallic layer,
the material layer being an oxidic, nitridic, oxynitridic or carbidic material layer containing at least one of the elements from the group consisting of titanium, aluminum, chromium, tungsten and molybdenum,
the metallic layer being formed from one or more of the metals of the group comprising chromium, brass, bronze, white metal, copper, zinc or tin,
wherein the providing of the at least one further layer on the at least one first layer includes applying a lubricating varnish including PTFE.

* * * * *